(12) United States Patent
Phan

(10) Patent No.: US 8,208,799 B2
(45) Date of Patent: Jun. 26, 2012

(54) METHOD AND SYSTEM FOR PVR SOFTWARE BUFFER MANAGEMENT TO SUPPORT SOFTWARE PASSAGE

(75) Inventor: Kevin T. Phan, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 1375 days.

(21) Appl. No.: 11/070,656

(22) Filed: Mar. 1, 2005

(65) Prior Publication Data

US 2006/0200846 A1 Sep. 7, 2006

(51) Int. Cl.

| | |
|---|---|
| *H04N 5/917* | (2006.01) |
| *H04N 5/44* | (2011.01) |
| *H04N 5/76* | (2006.01) |
| *H04N 5/78* | (2006.01) |
| *H04N 5/89* | (2006.01) |
| *H04N 5/94* | (2006.01) |
| *H04N 5/765* | (2006.01) |
| *H04N 5/783* | (2006.01) |
| *H04N 5/7824* | (2006.01) |
| *H04N 7/12* | (2006.01) |
| *H04N 7/18* | (2006.01) |
| *H04N 7/173* | (2011.01) |
| *H04N 9/88* | (2006.01) |
| *H04J 3/16* | (2006.01) |
| *H04L 12/28* | (2006.01) |
| *H04L 12/54* | (2006.01) |
| *G06F 3/00* | (2006.01) |
| *G06F 9/46* | (2006.01) |
| *G06F 13/00* | (2006.01) |
| *G06F 13/24* | (2006.01) |
| *G06F 13/28* | (2006.01) |
| *G06F 15/16* | (2006.01) |
| *G06F 15/173* | (2006.01) |

(52) U.S. Cl. ........ 386/328; 386/230; 386/232; 386/235; 386/265; 386/268; 386/317; 386/324; 386/334; 386/344; 386/345; 386/350; 386/355; 348/150; 348/734; 370/232; 370/389; 370/392; 370/395.1; 370/395.3; 370/395.4; 370/412; 370/428; 370/429; 370/470; 375/240.25; 375/240.26; 709/226; 709/233; 710/22; 710/48; 710/260; 711/112; 711/118; 711/144; 711/150; 711/156; 718/100; 725/88; 725/89; 725/102; 725/134

(58) Field of Classification Search .................... 386/68, 386/111, 125, E5.001, E9.001, 46, 230, 232, 386/235, 265, 268, 317, 324, 328, 350, 355, 386/E9.013, E9.059, 344; 370/389, 392, 370/412, 428, 429, 232, 395.1, 470, 395.3, 370/395.4; 375/240.25, 240.26, E7.004, 375/E7.278; 455/73, 560; 704/201; 710/22, 710/48, 260; 711/112, 118, 144, 156, 150; 725/88, 89, 102, 134; 341/59; 709/226, 709/233; 348/150, 734, E5.007; 700/11; 718/100

See application file for complete search history.

(56) References Cited

U.S. PATENT DOCUMENTS 5,477,541 A * 12/1995 White et al. ................. 370/392

(Continued)

OTHER PUBLICATIONS

Sony Electronics Inc., Freedom to Choose, Passage™, pp. 1-4, Feb. 10, 2003.

*Primary Examiner* — Thai Tran
*Assistant Examiner* — Syed Hasan
(74) *Attorney, Agent, or Firm* — Thomas, Kayden, Horstemeyer & Risley LLP.

(57) ABSTRACT

Methods and systems for a personal video recorder (PVR) software buffer management to support the software passage are disclosed. A first plurality of receive buffer descriptors may be allocated for recording at least one received packet in at least a portion of a shared memory. The received packet may be recorded in the shared memory utilizing at least one of the allocated first plurality of receive buffer descriptors. A plurality of playback buffer descriptors may be allocated for playback of the recorded received packet from the shared memory. A first portion of the received packet may be simultaneously played back from the shared memory while recording a second portion of the received packet in the shared memory. If at least one of the recorded received packet is consumed, the playback buffer descriptors corresponding to a number of the consumed received packet may be de-allocated.

30 Claims, 13 Drawing Sheets

U.S. PATENT DOCUMENTS

| | | | |
|---|---|---|---|
| 5,809,334 A * | 9/1998 | Galdun et al. | 710/22 |
| 5,996,013 A * | 11/1999 | Delp et al. | 709/226 |
| 6,081,783 A * | 6/2000 | Divine et al. | 704/500 |
| 6,185,438 B1 * | 2/2001 | Fox | 455/560 |
| 6,223,261 B1 * | 4/2001 | Ogawa | 711/150 |
| 6,438,319 B1 * | 8/2002 | Inoue et al. | 386/265 |
| 6,667,978 B1 * | 12/2003 | Delp et al. | 370/395.1 |
| 7,117,308 B1 * | 10/2006 | Mitten et al. | 711/118 |
| 7,774,778 B2 * | 8/2010 | Fujihara et al. | 718/100 |
| 2001/0007565 A1 * | 7/2001 | Weng et al. | 370/429 |
| 2001/0014100 A1 * | 8/2001 | Abe et al. | 370/412 |
| 2002/0061183 A1 * | 5/2002 | MacInnis | 386/68 |
| 2003/0165196 A1 * | 9/2003 | Demas et al. | 375/240.25 |
| 2004/0013406 A1 * | 1/2004 | Barton et al. | 386/69 |
| 2004/0155801 A1 * | 8/2004 | Lund et al. | 341/59 |
| 2005/0135395 A1 * | 6/2005 | Fan et al. | 370/412 |

* cited by examiner

METHOD AND SYSTEM FOR PVR SOFTWARE BUFFER MANAGEMENT TO SUPPORT SOFTWARE PASSAGE

RELATED APPLICATIONS

Not Applicable

FEDERALLY SPONSORED RESEARCH OR DEVELOPMENT

Not Applicable

MICROFICHE/COPYRIGHT REFERENCE

Not Applicable

FIELD OF THE INVENTION

Certain embodiments of the invention relate to processing bitstream information. More specifically, certain embodiments of the invention relate to a method and system for a personal video recorder (PVR) software buffer management to support software passage.

BACKGROUND OF THE INVENTION

Passage technology was introduced by Sony in 2002 and is relatively new in the communications field. The technology allows equipment from multiple vendors to co-exist on legacy digital cable television (CATV) networks. Passage technology supports multiple conditional access (CA) systems, and it treats each CA system independently. Passage also allows each CA system to operate on its own encrypted data. During encoding, only certain data may be selected for encryption. This process allows multiple conditional access systems to co-exist in an existing cable plant. An additional benefit is that passage technology supports digital video broadcast (DVB) open standards. The DVB open standards have been extended to allow communication to a passage encoding device, for example. Support for DVB open standards allows interchangeable headend equipment operation, and interoperability of multiple CA systems.

During encoding of a passage stream, vital data, essential for decoding, may be selected, duplicated, and encrypted once for legacy set-top boxes (STBs) and once for Passage STBs. Each STB may receive the same transport data and may appropriately select its STB-specific encrypted data. General, non-STB specific content may be shared by all STBs. In this regard, only the critical data necessary for recovering video or audio content may need to be encrypted, and the passage system may only encrypt critical data. If a decoder cannot receive the critical data, then the video image cannot be decompressed.

During decoding of a passage stream, a conventional set-top box (STB) receiver, for example, may utilize a plurality of on-chip memories to store received encoded data as well as decoded passage stream data prior to displaying. Utilizing separate memories for recording encoded passage stream information and decoded information significantly reduces the processing efficiency of the STB and increases implementation cost.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for a personal video recorder (PVR) software buffer management to support software passage, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Figure 1:
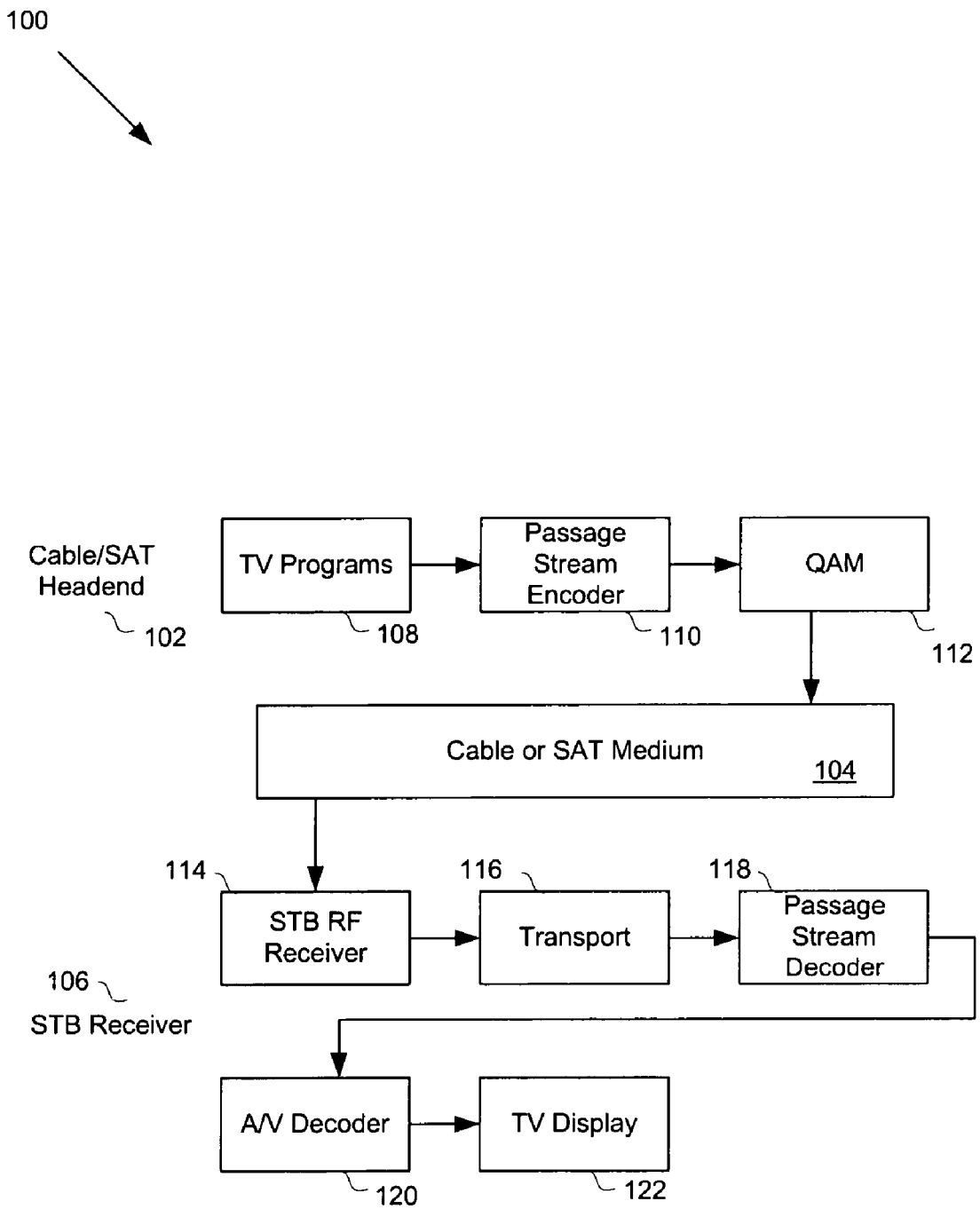
FIG. 1 is a high level block diagram illustrating an exemplary system for processing a passage stream, in accordance with an embodiment of the invention.

Certain embodiments of the invention may be found in a method and system for a personal video recorder (PVR) software buffer management to support the software passage. A passage stream decoder may be adapted to utilize a single shared memory during recording of encoded passage stream information and during playing back, or decoding, of the stored passage stream information. Initially, a software driver within the passage decoder may create a buffer in the shared memory, which may be simultaneously utilized by both recording and playback hardware modules, for example, to use. Further, a half list, or approximately a half list, of record descriptors may be allocated with the buffer addresses mapping to the top half of the allocated shared memory buffer. By utilizing a half, or approximately a half of the memory, encoded passage stream information may be recorded and then played back utilizing the same memory and without a need to duplicate recorded information prior to playback. This eliminates a need for separate recording and playback memories for recording and playback.

In accordance with an embodiment of the invention, a first plurality of receive buffer descriptors may be allocated for recording at least one received packet in at least a portion of a shared memory. The received packet may be recorded in the shared memory utilizing at least one of the allocated first plurality of receive buffer descriptors. A plurality of playback buffer descriptors may be allocated for playback of the recorded received packet from the shared memory. A first portion of the received packet may be simultaneously played back from the shared memory while recording a second portion of the received packet in the shared memory. If at least one of the recorded received packet is consumed, the playback buffer descriptors corresponding to a number of the consumed received packet may be de-allocated.

A second plurality of receive buffer descriptors corresponding to the number of the consumed recorded received packet may be allocated. The received packet may comprise a Transport Passage packet. Approximately one half of the shared memory may be allocated for the recording of the received packet. The received packet may be decoded prior to the recording. The recorded received packet may be decoded prior to playback. If a last one of the allocated first plurality of receive buffer descriptors is utilized, a first of the allocated first plurality of receive buffer descriptors may be wrapped around. If a last one of the allocated plurality of playback buffer descriptors is utilized, a first of the allocated plurality of playback buffer descriptors may be wrapped around.

Another embodiment of the invention may provide a machine-readable storage, having stored thereon, a computer program having at least one code section executable by a machine, thereby causing the machine to perform the steps as described herein for personal video recorder (PVR) software buffer management to support the software passage.

FIG. 1 is a high level block diagram illustrating an exemplary system for processing a passage stream, in accordance with an embodiment of the invention. Referring to FIG. 1, the exemplary system 100 may comprise a cable/satellite (SAT) headend 102, cable or SAT medium 104, and a set-top box (STB) receiver 106. The cable/SAT headend 102 may comprise TV programs source 108, a passage stream encoder 110, and quadrature amplitude modulation (QAM) block 112. The STB receiver 106 may comprise an STB radio frequency (RF) receiver block 114, a transport block 116, a passage stream decoder 118, an audio/video (A/V) decoder 120, and a TV display 122.

In operation, data stream from the TV program source 108 may be encoded utilizing the passage stream encoder 110. The encoded passage stream may then be modulated by the QAM block 112 and transmitted via the cable or SAT medium 104. The transmitted encoded passage stream may be received by the STB RF receiver 114. The transport block 116 may transport the received encoded passage stream to the passage stream decoder 118. The passage stream decoder 118 may comprise suitable circuitry, logic, and/or code and may be adapted to decode the received encoded passage stream to an encoded stream in a more conventional format, such as MPEG-2. The simplified encoded stream may be communicated to the A/V decoder 120 for decoding. Decoded audio and video streams may then be communicated to the TV display 122 for presentation thereon.

In an exemplary aspect of the invention, the passage stream decoder 118 may be implemented in software and/or as a dedicated processor utilizing a single shared memory for recording encoded passage information and playing back the stored encoded passage information prior to decoding. This playing back occurs without having to copy the data to be played back from a recording memory to a playback memory.

Figure 2:
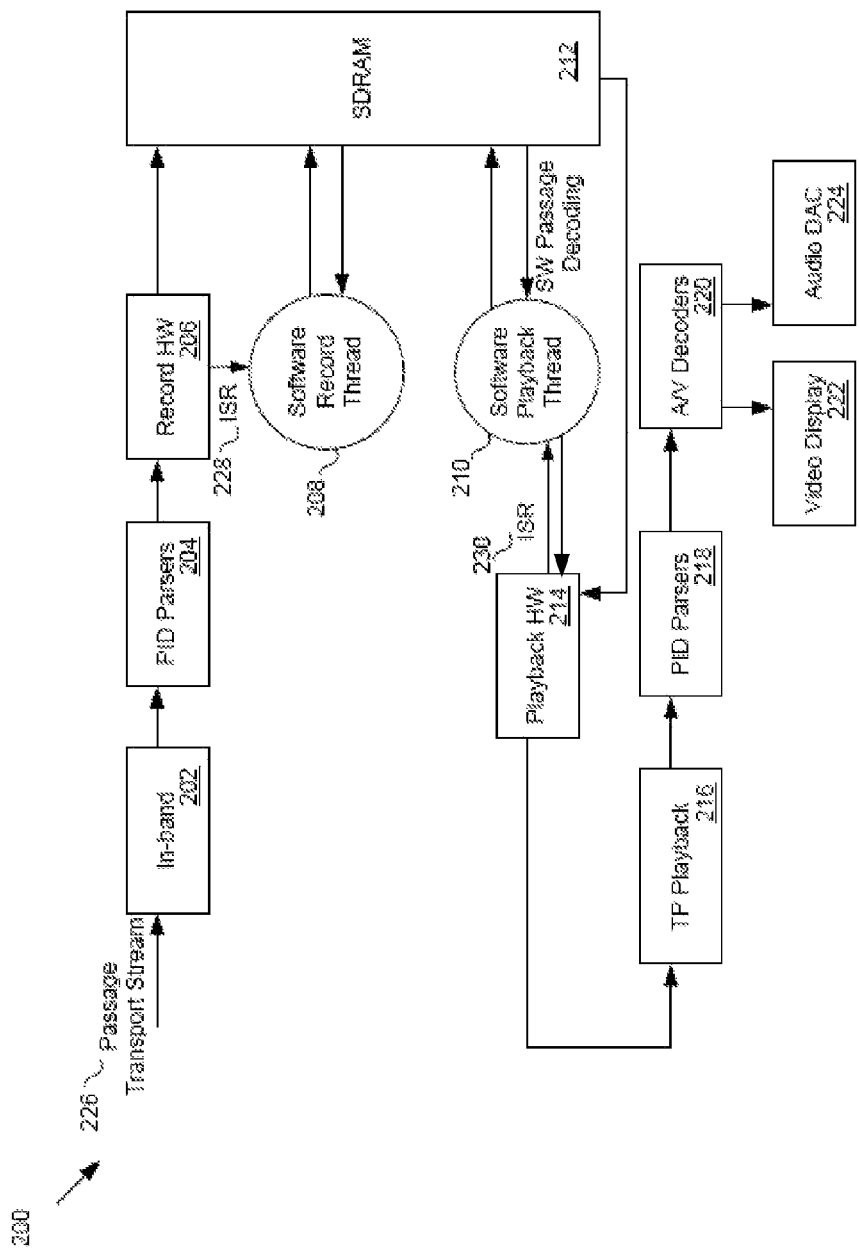
FIG. 2 is a block diagram illustrating an exemplary passage stream decoder, in accordance with an embodiment of the invention.

FIG. 2 is a block diagram illustrating an exemplary passage stream decoder, in accordance with an embodiment of the invention. Referring to FIG. 2, the passage stream decoder 200 may comprise an in-band block 202, program ID (PID) parser block 204, record hardware 206, software record thread 208, software playback thread 210, memory 212, playback hardware 214, transport packet (TP) playback block 216, PID parser block 218, A/V decoder 220, video display 222, and audio digital-to-analog (DAC) converter 224.

The in-band block 202 may comprise suitable circuitry, logic, and/or code and may be adapted receive the passage transport stream 226. The passage transport stream 226 may be communicated inband. The PID parser block 204 may comprise PID information for legacy video/audio, shadow video/audio, and/or optional PIDs and may be adapted to select PIDs depending on whether audio or video information will be decoded.

The record hardware block 206 may comprise suitable circuitry, logic, and/or code and may be configured to record passage stream packets containing the PIDS selected by the PID parser 204 into the memory 212. The memory 212 may comprise SDRAM, for example. The passage stream decoder 200 may allocate about 480 Kbytes to 1.5 Mbytes, for example, of the SDRAM memory 212, which may be utilized to record the passage stream. The decoder 200 may also be adapted to create a list of hardware record descriptors for the record hardware 206 and to manage the memory 212. The software record thread 208 may be utilized to manage the record descriptor list and to check the record hardware 206 for new recorded passage stream packets in the memory 212. The software record thread 208 may also be utilized to indicate to the software playback thread 210 the packet memory addresses and size of a newly recorded passage stream packet. The record hardware 206 may generate a signal such as an interrupt signal 228 for the software record thread 208 when the record hardware 206 finishes recording passage stream packets into the shared memory 212.

The software playback thread 210 may be adapted to receive notifications from the software record thread 208 for newly recorded passage stream packets that may be recorded into the shared memory 212. After receiving a signal indicating the recording of new passage stream packets from the software record thread 208, the software playback thread 210 may perform passage stream decoding. Passage stream decoding may be utilized to transform the passage stream packets into an MPEG-2 formatted stream, for example. In addition, the software playback thread 210 may be adapted to manage the playback of information indicated by the hardware descriptors. The software packet thread 210 may communicate the decoded passage streams to the playback hardware 214. The playback hardware 214 may generate a signal such as an interrupt signal 230 for the software playback thread 210 when the playback hardware 214 finishes playing back, or decoding, passage stream packets recorded into the shared memory 212.

In an exemplary aspect of the invention, the playback hardware 214 may be configured to feed passage stream packets into the TP playback block 216. Each of the passage stream packets may be identified for processing by the PID parser 218 and the A/V decoder 220. The playback hardware 214 may also be configured to program and/or reset PID tables within the PID parser 218 so that legacy video, legacy audio, and/or optional PIDs may be selected for processing. The selected passage stream may then be communicated to the A/V decoder 220 for decoding. Decoded video information may be communicated to the video display 222 and audio information may be communicated to the audio DAC 224 for further processing.

In one aspect of the invention, the passage stream decoder 200 may be adapted to utilize a single shared memory 212 during simultaneous recording of encoded passage stream information and during playing back, or decoding, of the stored passage stream information. Initially, a software driver within the passage stream decoder 200 may create a buffer in the shared memory for record and playback hardware modules 206 and 214, respectively, to use. Further, a half list, or approximately a half list of record descriptors may be allocated with corresponding buffer addresses being mapped to the top half of the allocated shared memory buffer within the memory 212. The list of playback descriptors may initially be left empty. The software driver may configure the record/playback hardware to trigger a signal such as an interrupt signal each time it completes consuming of the data associated with a descriptor.

After the software driver within the decoder 200 starts the record hardware 206 with a half list of record descriptors and the playback hardware 214 with an empty list of the playback descriptors, the software driver may check the number of record descriptors which are consumed by the record hardware 206. Based on this number, the software driver may allocate an equivalent number of new record descriptors with the buffer addresses mapping to the remaining half of the allocated buffer in the shared memory 212. The new record descriptors may be inserted at the end of the existing record descriptor list. The software driver may build an equivalent number of playback descriptors with the address buffers pointing to the locations where the consumed record descriptors buffer addresses are, and may add the descriptors to the existing playback descriptor list. When the software driver reaches the last descriptor, the software driver may allocate the next descriptor with buffer address pointing to the beginning location of the allocated shared memory buffer.

Figure 3:
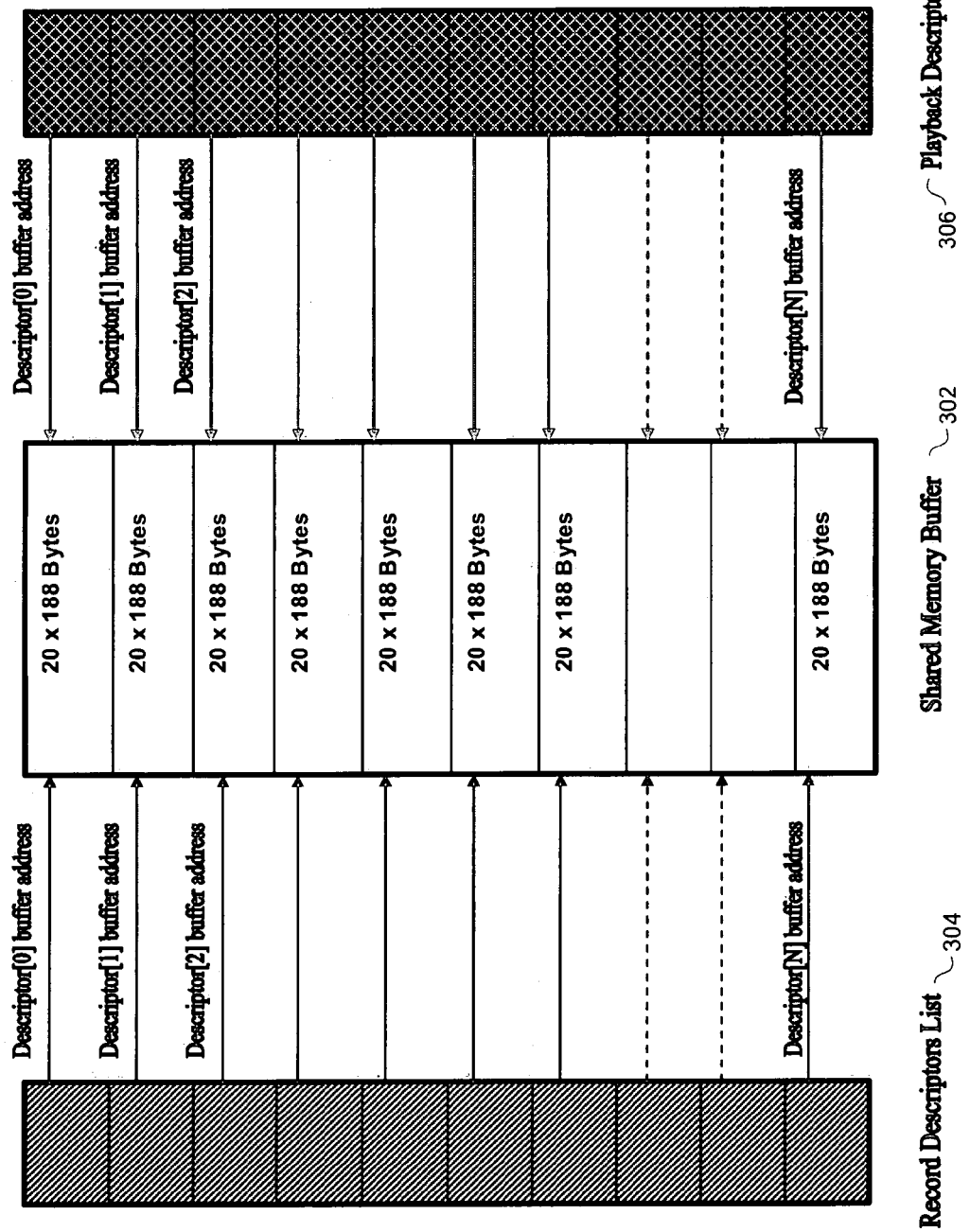
FIG. 3 is a block diagram illustrating utilization of a shared memory within a passage stream decoder, in accordance with an embodiment of the invention.

FIG. 3 is a block diagram illustrating utilization of a shared memory within a passage stream decoder, in accordance with an embodiment of the invention. Referring to FIG. 3, a software driver within a passage stream decoder, such as the passage stream decoder 200 in FIG. 2, may allocate a shared memory buffer 302 for use by playback and record hardware, for example.

In an exemplary aspect of the invention, the shared memory buffer 302 may be segmented into 256 segments, 20×188 bytes each, so that each segment may store 20 MPEG passage transport packets. The record hardware descriptor list 304 and the playback hardware descriptor list 306 may comprise descriptors allocated for corresponding memory segments, as illustrated in FIG. 3. In addition, record/playback hardware within the passage stream decoder may be configured to generate interrupt signals when record hardware finishes filling up the 20×188 bytes or playback finishes reading the data out of the 20×188 bytes buffer segments in the shared memory.

In another aspect of the invention, in order to utilize the shared memory more efficiently and without data overruns, record and playback hardware may be adapted to utilize one half, or approximately half, of the record descriptor list 304 and the playback descriptor list 306.

Figure 4:
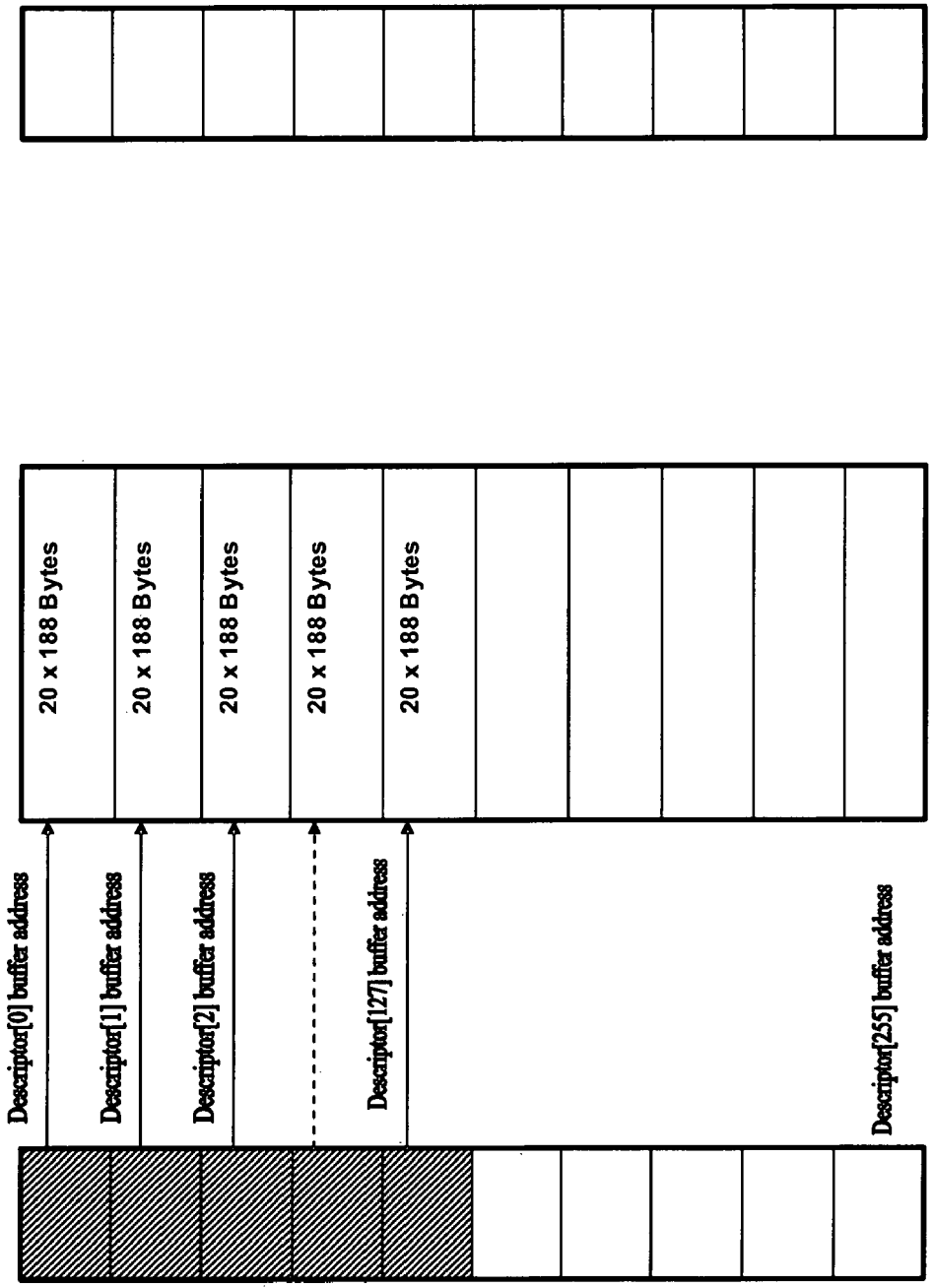
FIG. 4 is a block diagram illustrating utilization of record descriptors for a shared memory within a passage stream decoder, in accordance with an embodiment of the invention.

FIG. 4 is a block diagram illustrating utilization of record descriptors for a shared memory within a passage stream decoder, in accordance with an embodiment of the invention. Referring to FIG. 4, the shared memory may comprise 256 segments, 20×188 bytes each. Therefore, at the initial state of processing passage stream information, a software driver within the passage stream decoder may allocate a record descriptor list 404 comprising 128 record hardware descriptors. Corresponding buffer addresses may be mapped to the top half of the shared memory buffer, as illustrated in FIG. 4. The playback descriptor list 406 may be left empty.

Figure 5:
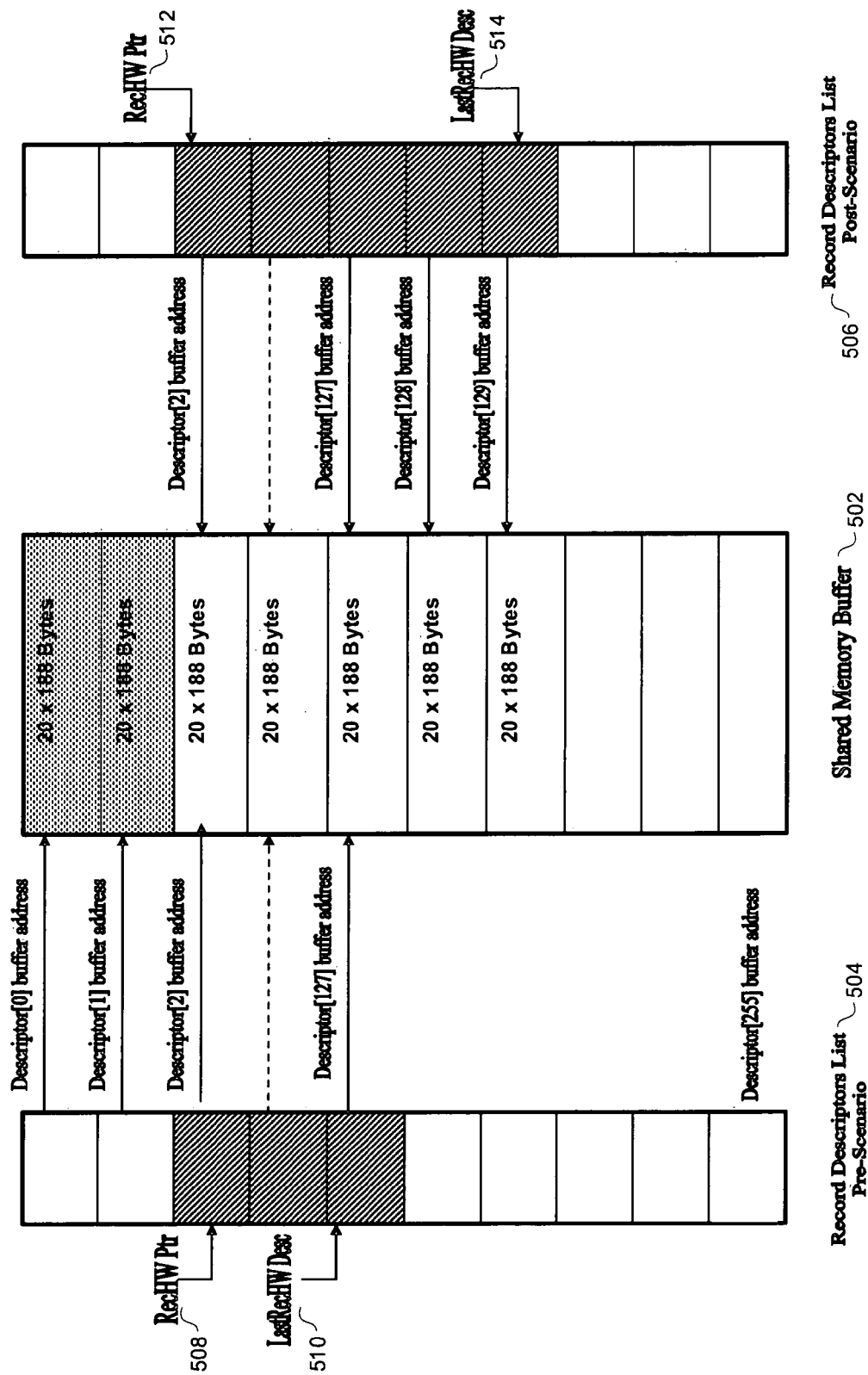
FIG. 5 is a block diagram illustrating an exemplary scenario for utilization of a record descriptor list for a shared memory within a passage stream decoder, in accordance with an embodiment of the invention.

FIG. 5 is a block diagram illustrating an exemplary scenario for utilization of a record descriptor list for a shared memory within a passage stream decoder, in accordance with an embodiment of the invention. Referring to FIG. 5, there is illustrated an exemplary scenario in which the record hardware has completed recording 2 record descriptor buffers in the shared memory 502. During an exemplary record descriptor list pre-scenario 504, the record hardware may be working on the record descriptor index 2 indicated by a recording hardware pointer, RecHWPtr, 508 and the last valid record descriptor may be at index 127 as indicated by pointer last recording hardware descriptor, LastRecHWDesc, 510. During an exemplary record descriptor list post scenario 506, two additional descriptors, for example, may have been allocated and the record hardware may be working on the record descriptor index 2 indicated by the pointer RecHWPtr 512 and the last valid record descriptor may be at index 129 as indicated by pointer LastRecHWDesc 514.

Since two record descriptors are done, a software driver within the passage stream decoder may construct the next two record descriptors, with indexes 128 and 129, where the buffer addresses may be mapped to the next available segments in the shared memory 502. In addition to managing the record descriptor list after two record descriptors are done, the software driver within the passage stream decoder may also manages and update the playback descriptor list, as described in more detail in FIG. 6 below.

Figure 6:
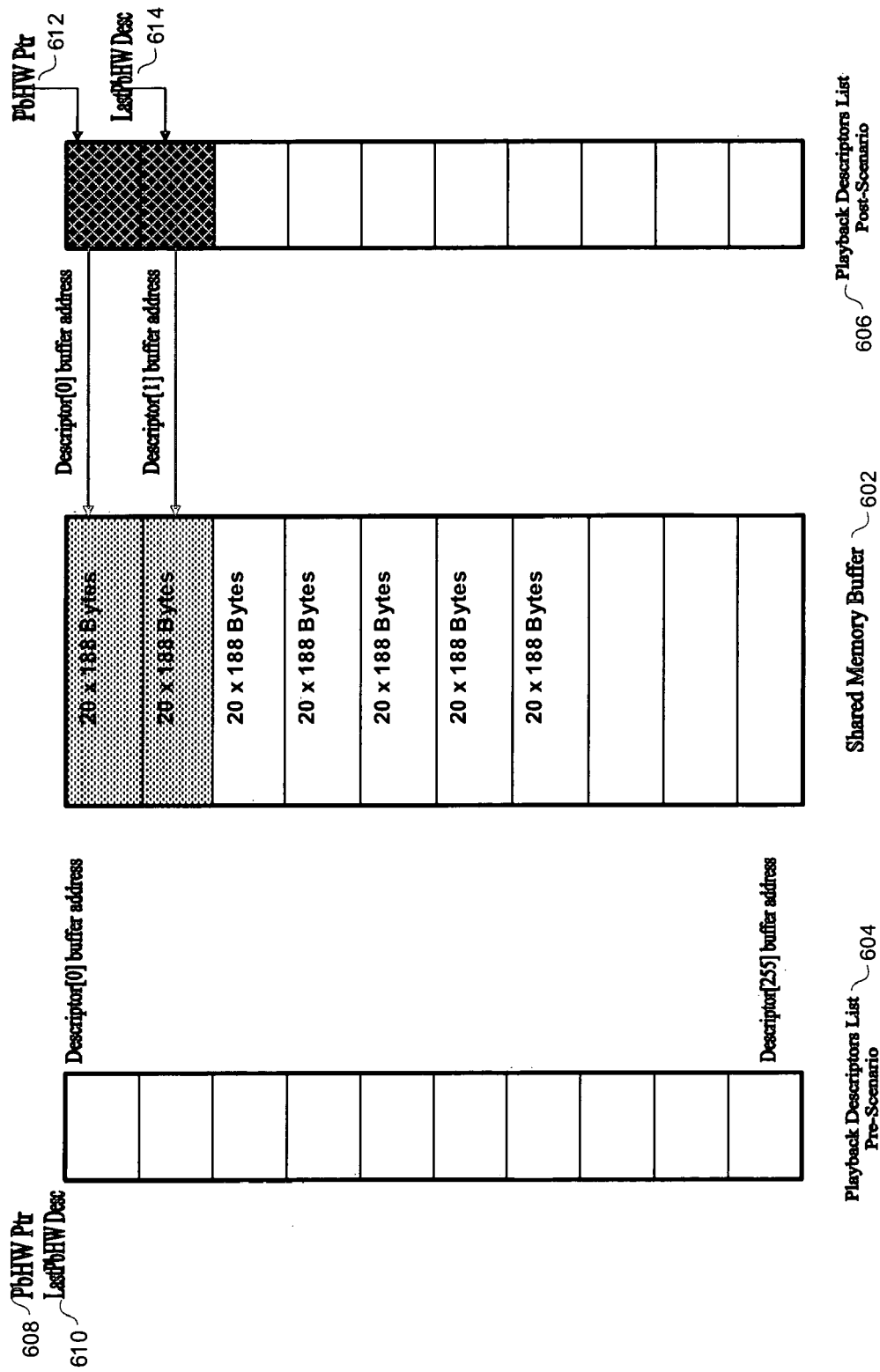
FIG. 6 is a block diagram illustrating an exemplary scenario for utilization of a playback descriptor list for a shared memory within a passage stream decoder, in accordance with an embodiment of the invention.

FIG. 6 is a block diagram illustrating an exemplary scenario for utilization of a playback descriptor list for a shared memory within a passage stream decoder, in accordance with an embodiment of the invention. Referring to FIG. 6, during an exemplary playback descriptor list pre-scenario 604, the playback hardware pointer (PbHWPtr) 608 and the last playback hardware descriptor (LastPbHWDesc) 610 may be invalid since no descriptors have yet been allocated. This may indicate that the playback hardware has already started but it does not have any recorded information to consume, or play back.

During an exemplary playback descriptor list post-scenario 606, the record hardware may finish recording two segments of data in the shared memory 602. In response to the two complete record descriptors, a software driver may configure two playback descriptors with the buffer addresses mapped to the two new recorded buffers in the shared memory 602 and may add the descriptors to the playback descriptor list. In this regard, the playback hardware pointer 612 may point to the descriptor with index 0 and the playback hardware may start working on this descriptor. The last valid playback descriptor 614 is at index 1 of the playback descriptor list.

Figure 7:
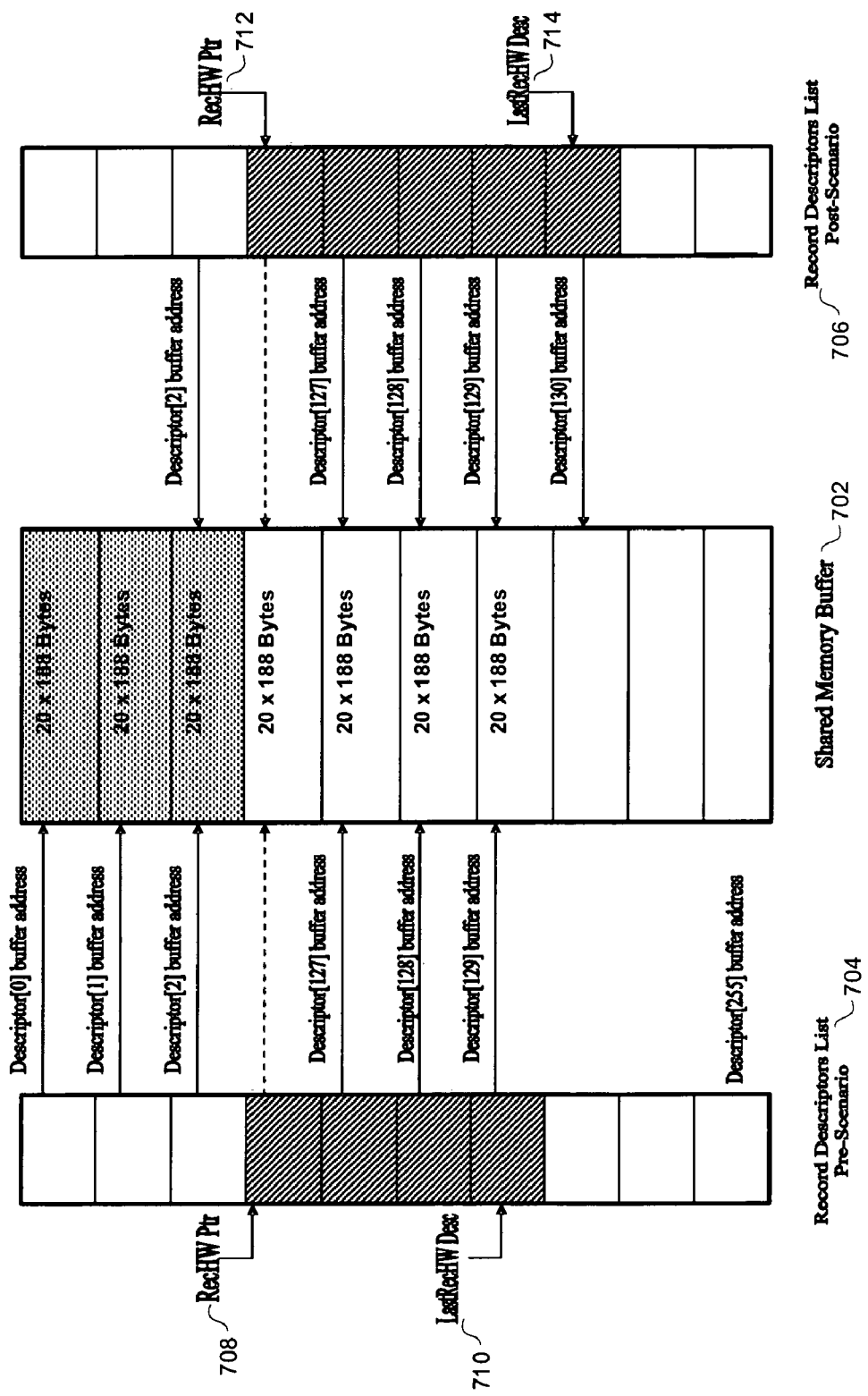
FIG. 7 is a block diagram illustrating an exemplary scenario for utilization of a record descriptor list for a shared memory within a passage stream decoder, in accordance with an embodiment of the invention.

FIG. 7 is a block diagram illustrating an exemplary scenario for utilization of a record descriptor list for a shared memory within a passage stream decoder, in accordance with an embodiment of the invention. Referring to FIG. 7, there is illustrated a scenario where another record descriptor is allocated by the record hardware following the record descriptor allocation illustrated in FIG. 5. During an exemplary record descriptor list pre-scenario 704, the record hardware pointer (RecHWPtr) 708 may be pointing to data indicated by descriptor index 3 which is being worked on, and the last record hardware descriptor 710 may be pointing to descriptor index 129. Since another segment in the shared memory 702 is filled, the software driver may construct another record descriptor where the buffer address may be mapped to the next available segment in the shared memory 702. The new descriptor may be added to the end of the record descriptor list. During an exemplary record descriptor list post-scenario 706, the last valid record descriptor 714 may be at descriptor index 130 and three segments in the shared memory 702 may store passage stream recorded data.

Figure 8:
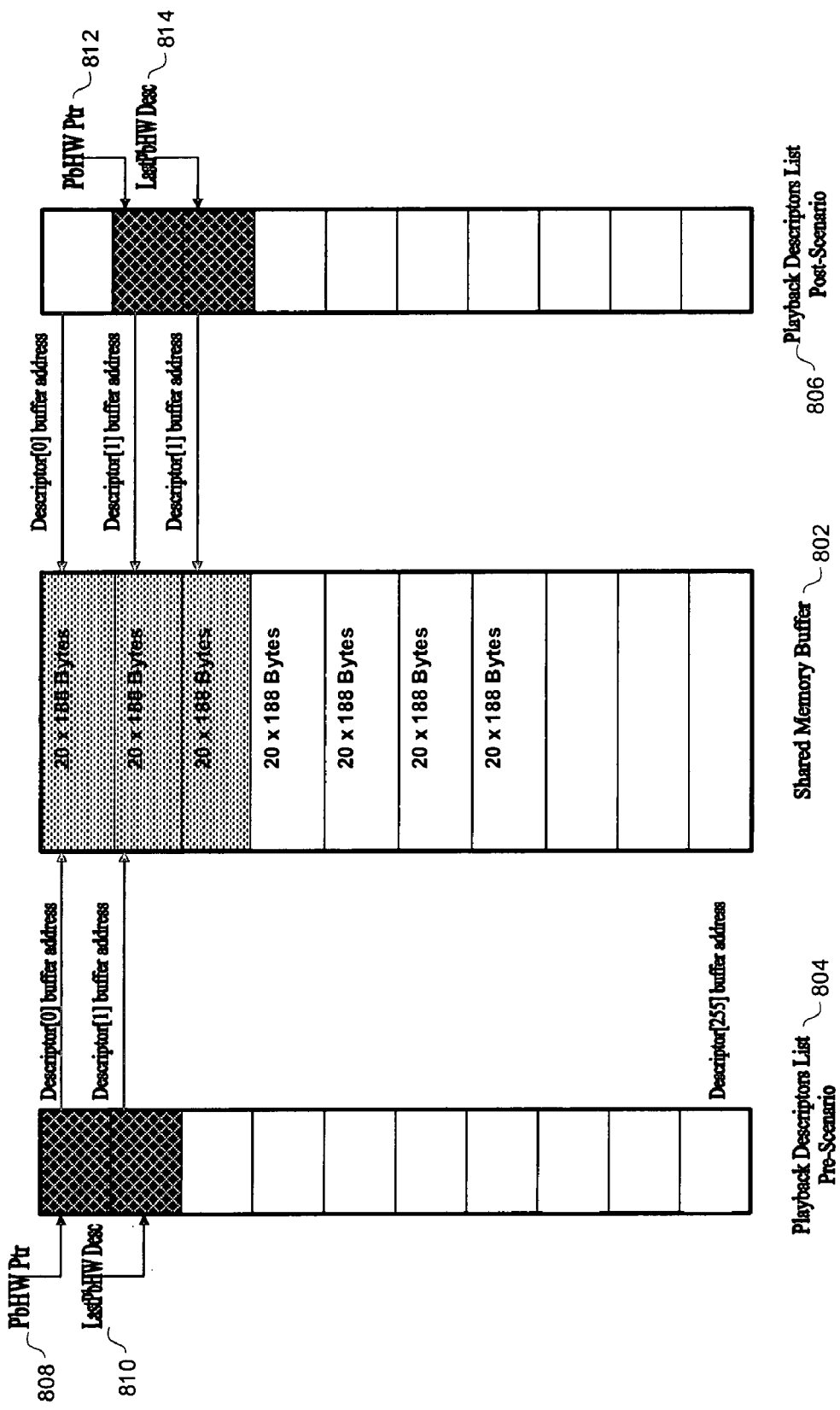
FIG. 8 is a block diagram illustrating an exemplary scenario for utilization of a playback descriptor list for a shared memory within a passage stream decoder, in accordance with an embodiment of the invention.

FIG. 8 is a block diagram illustrating an exemplary scenario for utilization of a playback descriptor list for a shared memory within a passage stream decoder, in accordance with an embodiment of the invention. Referring to FIG. 8, during an exemplary playback descriptor list pre-scenario 804, the playback hardware pointer 808 may be pointing to data indicated by the playback descriptor index 0 that is being worked on and the last valid playback hardware descriptor 810 may be at descriptor index 1. Following the playback descriptor list pre-scenario 804, an additional record descriptor may be completed and the software driver may construct another playback descriptor with the same buffer address where the new record descriptor is pointing. Accordingly, during an exemplary playback descriptor list post-scenario 806, an additional playback descriptor may be added to the list and the last valid playback descriptor 814 may be at index 2. The playback hardware may have completed processing information associated with descriptor index 0 so the playback hardware pointer 812 may be pointing at descriptor index 1.

Figure 9:
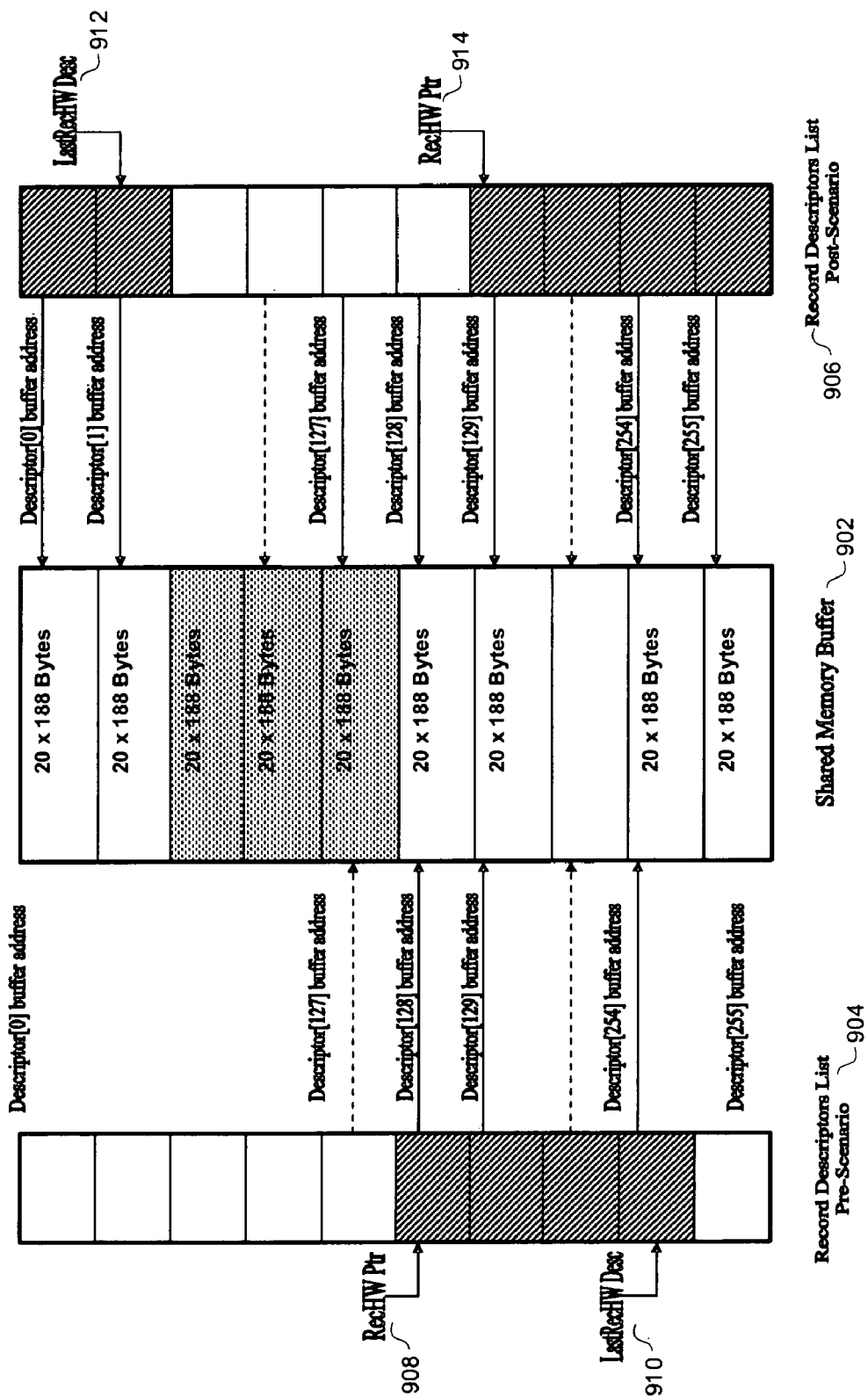
FIG. 9 is a block diagram illustrating an exemplary scenario for utilization of a record descriptor list for a shared memory within a passage stream decoder, in accordance with an embodiment of the invention.

FIG. 9 is a block diagram illustrating an exemplary scenario for utilization of a record descriptor list for a shared memory within a passage stream decoder, in accordance with an embodiment of the invention. Referring to FIG. 9, during an exemplary record descriptor list pre-scenario 904, the record descriptor pointer 908 is pointing at descriptor index 128 and the last record hardware descriptor 910 is at descriptor index 254. Following the record descriptor list pre-scenario 904, three additional record descriptors may be completed. The software driver may then wrap around the descriptors by constructing one record descriptor with the address buffer mapped to the last segment of the shared memory 902 and the other two record descriptors allocated to the beginning segments of the shared memory 902.

Figure 10:
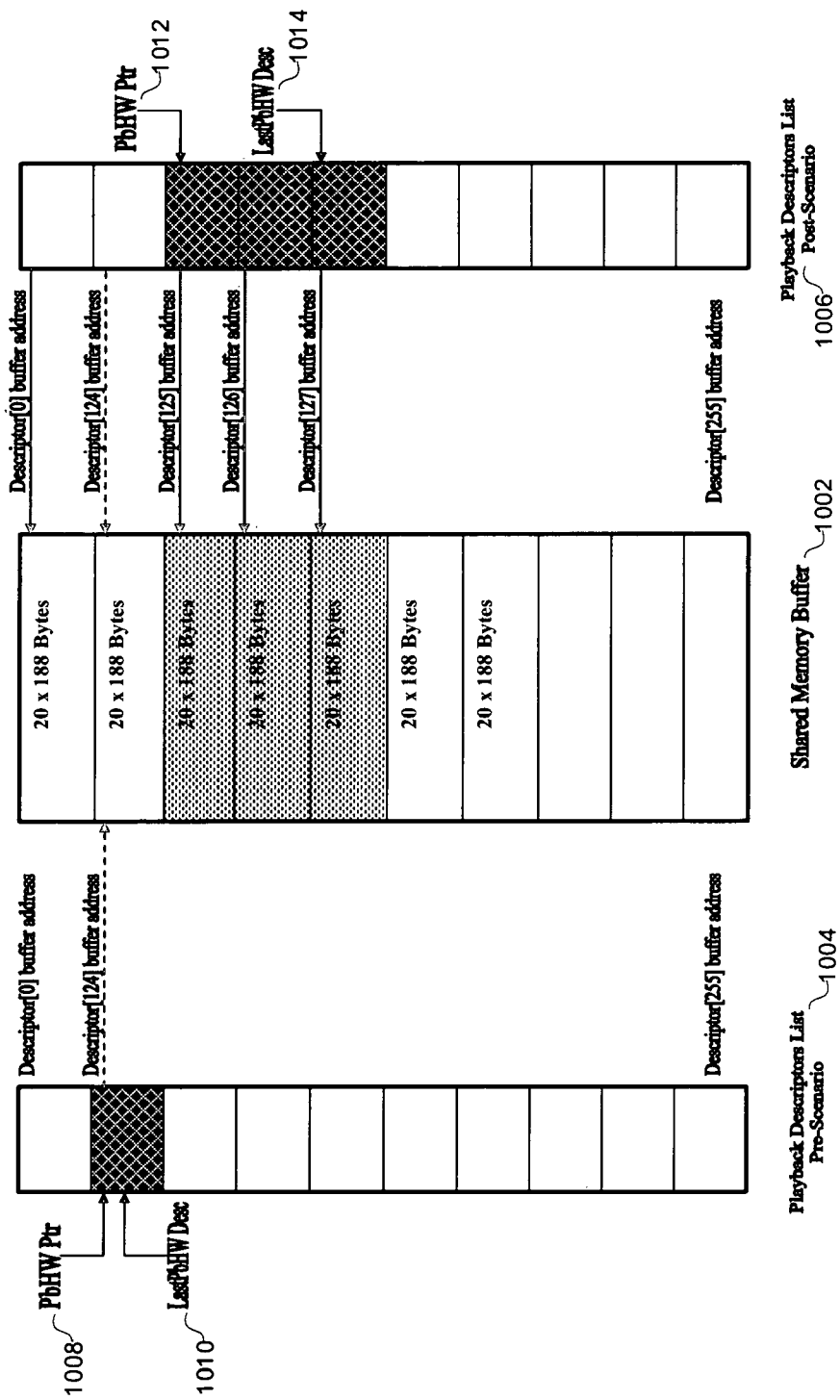
FIG. 10 is a block diagram illustrating an exemplary scenario for utilization of a playback descriptor list for a shared memory within a passage stream decoder, in accordance with an embodiment of the invention.

FIG. 10 is a block diagram illustrating an exemplary scenario for utilization of a playback descriptor list for a shared memory within a passage stream decoder, in accordance with an embodiment of the invention. Referring to FIG. 10, during an exemplary playback descriptor list pre-scenario 1004, the playback descriptor pointer 1008 is pointing at descriptor index 124 and the last playback hardware descriptor 1010 is at the same descriptor index 124. Following the playback descriptor list pre-scenario 1004, three additional record descriptors may be completed. During an exemplary playback descriptor list post-scenario 1006, the software driver may construct three playback descriptors with buffer addresses mapping to three new recorded buffers. The three playback descriptors may also be added to the playback descriptor list so that the playback hardware pointer 1012 may be pointing at descriptor index 125 and the last playback hardware descriptor 1014 may be at descriptor index 127.

Figure 11:
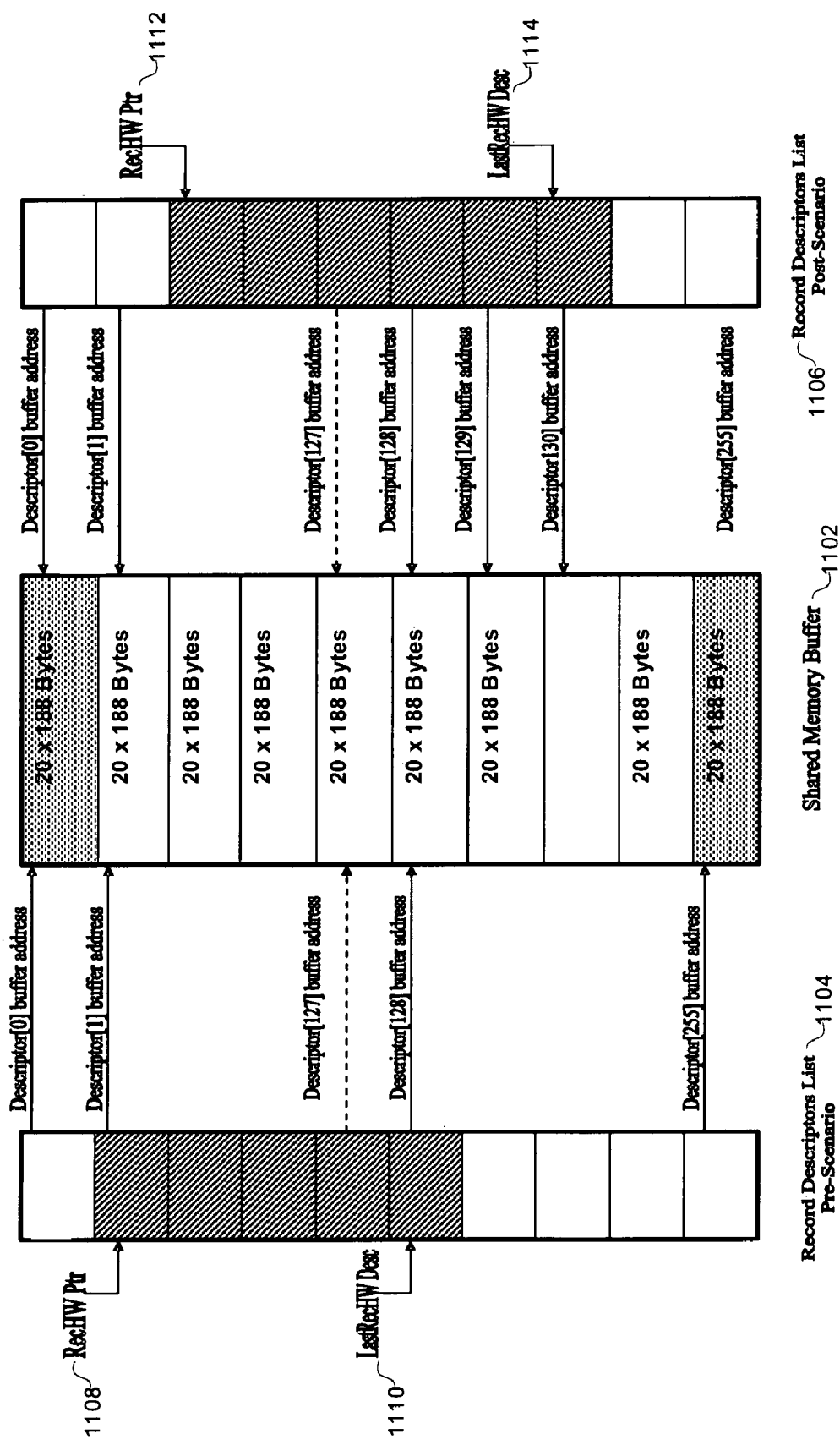
FIG. 11 is a block diagram illustrating an exemplary scenario for utilization of a record descriptor list for a shared memory within a passage stream decoder, in accordance with an embodiment of the invention.

FIG. 11 is a block diagram illustrating an exemplary scenario for utilization of a record descriptor list for a shared memory within a passage stream decoder, in accordance with an embodiment of the invention. Referring to FIG. 11, during an exemplary record descriptor list pre-scenario 1104, the record descriptor pointer 1108 is pointing at descriptor index 1 and the last record hardware descriptor 1110 is at descriptor index 128. Following the record descriptor list pre-scenario 1104, two additional record descriptors may be completed, with descriptor indexes 0 and 255 corresponding to a first and a last memory segment within the shared memory 1102. During an exemplary record descriptor list post-scenario 1106, the software driver may construct two additional record descriptors. The two record descriptors may also be added to the record descriptor list so that the last record hardware descriptor 1114 may be at descriptor index 130.

Figure 12:
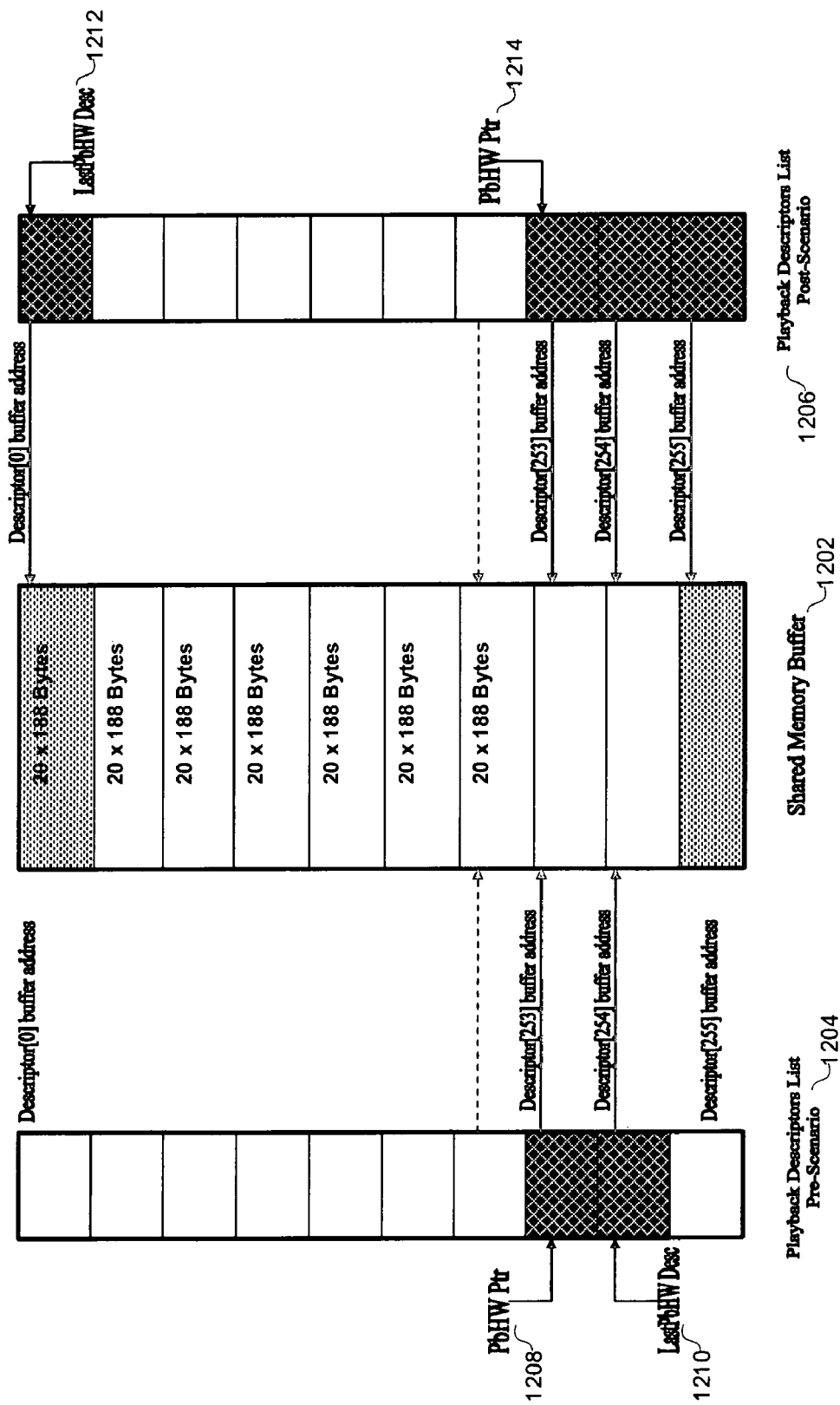
FIG. 12 is a block diagram illustrating an exemplary scenario for utilization of a playback descriptor list for a shared memory within a passage stream decoder, in accordance with an embodiment of the invention.

FIG. 12 is a block diagram illustrating an exemplary scenario for utilization of a playback descriptor list for a shared memory within a passage stream decoder, in accordance with an embodiment of the invention. Referring to FIG. 12, during an exemplary playback descriptor list pre-scenario 1204, the playback descriptor pointer 1208 is pointing at descriptor index 253 and the last playback hardware descriptor 1210 is at descriptor index 254. Following the playback descriptor list pre-scenario 1204, two additional record descriptors may be completed. During an exemplary playback descriptor list post-scenario 1206, the software driver may then wrap around the playback descriptors by constructing one playback descriptor at descriptor index 255 with the address buffer mapped to the last segment of the shared memory 1202 and the other playback descriptor at descriptor index 0 allocated to the beginning segment of the shared memory 1202.

Figure 13:
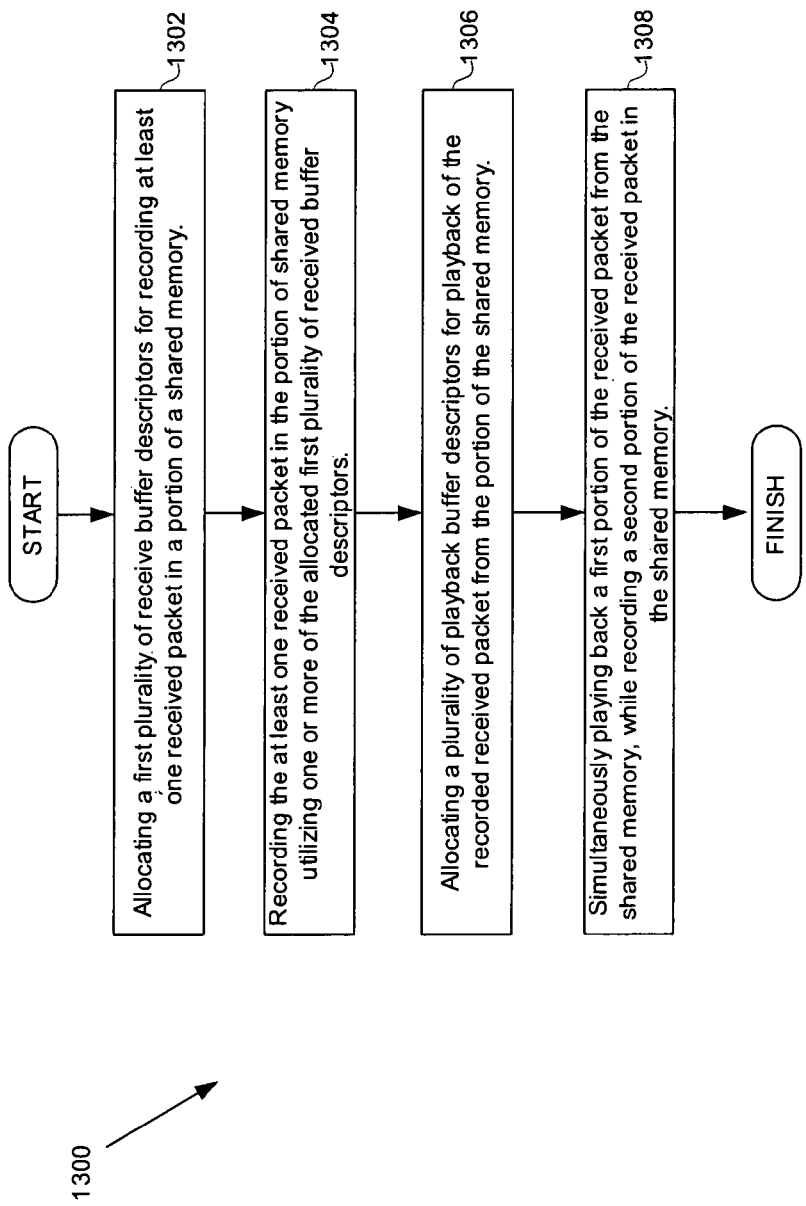
FIG. 13 is a flow diagram illustrating exemplary steps for processing a packet, in accordance with an embodiment of the invention.

FIG. 13 is a flow diagram illustrating exemplary steps for processing a packet, in accordance with an embodiment of the invention. Referring to FIG. 13, at 1302, a first plurality of receive buffer descriptors may be allocated for recording at least one received packet in at least a portion of a shared memory. At 1304, the received packet may be recorded in the shared memory utilizing at least one of the allocated first plurality of receive buffer descriptors. At 1306, a plurality of playback buffer descriptors may be allocated for playback of the recorded received packet from the shared memory. At 1308, a first portion of the received packet may be simultaneously played back from the shared memory while recording a second portion of the received packet in the shared memory.

Referring to FIG. 4, in an exemplary aspect of the invention, a system for processing a packet may comprise at least one processor that allocates a first plurality of receive buffer descriptors in the descriptor list 404 for recording at least one received packet in a shared memory 402. The received packet may be recorded by the processor in the shared memory 402 utilizing one or more of the allocated receive buffer descriptors in the descriptor list 404. A plurality of playback buffer descriptors in the descriptor list 406 may be allocated by the processor for playback of the recorded received packet from the shared memory 402.

The processor may simultaneously play back a first portion of the received packet from the shared memory 402 while recording a second portion of the received packet in the shared memory 402. If a recorded received packet is consumed, the playback buffer descriptors in the descriptor list 406 corresponding to a number of the consumed recorded received packet may be de-allocated by the processor. A second plurality of receive buffer descriptors in the descriptor list 404 may be allocated by the processor corresponding to the number of the consumed recorded received packet. The received packet may comprise a Transport Passage packet.

The processor may allocate approximately one half of the shared memory 402 for the recording of the received packet and may decode the received packet prior to the recording. The recorded received packet may be decoded by the processor prior to playback. If a last one of the allocated receive buffer descriptors in the descriptor list 404 is utilized, the processor may wrap around to a first of the allocated receive buffer descriptors in the descriptor list 404 and/or to a first of the allocated plurality of playback buffer descriptors in the descriptor list 406.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for processing a packet, the method comprising:
    allocating a first plurality of receive buffer descriptors for recording at least one received packet in at least a portion of a shared memory;
    recording said at least one received packet in said at least a portion of said shared memory utilizing at least one of said allocated first plurality of receive buffer descriptors;
    responsive to said recording, allocating a plurality of playback buffer descriptors for playback of said recorded said at least one received packet from said at least a portion of said shared memory; and
    decoding a first portion of said at least one received packet from said shared memory, while recording a second portion of said at least one received packet in said shared memory.

2. The method according to claim 1, comprising simultaneously playing back said first portion of said at least one received packet from said shared memory, while recording said second portion of said at least one received packet in said shared memory.

3. The method according to claim 1, comprising, if at least one of said recorded at least one received packet is consumed, de-allocating said plurality of playback buffer descriptors corresponding to a number of said consumed recorded at least one received packet.

4. The method according to claim 3, comprising allocating a second plurality of receive buffer descriptors corresponding to said number of said consumed recorded at least one received packet.

5. The method according to claim 1, wherein said at least one received packet comprises a Transport Passage packet.

6. The method according to claim 1, comprising allocating approximately one half of said shared memory for said recording of said at least one received packet.

7. The method according to claim 1, comprising decoding said at least one received packet prior to said recording.

8. The method according to claim 1, comprising decoding said recorded at least one received packet prior to playback.

9. The method according to claim 1, comprising, if a last one of said allocated first plurality of receive buffer descriptors is utilized, wrapping around to a first of said allocated first plurality of receive buffer descriptors.

10. The method according to claim 1, comprising, if a last one of said allocated plurality of playback buffer descriptors is utilized, wrapping around to a first of said allocated plurality of playback buffer descriptors.

11. A non-transitory machine-readable storage having stored thereon, a computer program having at least one code section for processing a packet, the at least one code section being executable by a machine to perform steps comprising:
    allocating a first plurality of receive buffer descriptors for recording at least one received packet in at least a portion of a shared memory;
    recording said at least one received packet in said at least a portion of said shared memory utilizing at least one of said allocated first plurality of receive buffer descriptors;
    responsive to said recording, allocating a plurality of playback buffer descriptors for playback of said recorded said at least one received packet from said at least a portion of said shared memory; and decoding a first portion of said at least one received packet from said shared memory, while recording a second portion of said at least one received packet in said shared memory.

12. The non-transitory machine-readable storage according to claim 11, wherein said at least one code section comprises code for simultaneously playing back said first portion of said at least one received packet from said shared memory, while recording said second portion of said at least one received packet in said shared memory.

13. The non-transitory machine-readable storage according to claim 11, wherein said at least one code section comprises code for de-allocating said plurality of playback buffer descriptors corresponding to a number of said consumed recorded at least one received packet, if at least one of said recorded at least one received packet is consumed.

14. The non-transitory machine-readable storage according to claim 13, wherein said at least one code section comprises code for allocating a second plurality of receive buffer descriptors corresponding to said number of said consumed recorded at least one received packet.

15. The non-transitory machine-readable storage according to claim 11, wherein said at least one received packet comprises a Transport Passage packet.

16. The non-transitory machine-readable storage according to claim 11, wherein said at least one code section comprises code for allocating approximately one half of said shared memory for said recording of said at least one received packet.

17. The non-transitory machine-readable storage according to claim 11, wherein said at least one code section comprises code for decoding said at least one received packet prior to said recording.

18. The non-transitory machine-readable storage according to claim 11, wherein said at least one code section comprises code for decoding said recorded at least one received packet prior to playback.

19. The non-transitory machine-readable storage according to claim 11, wherein said at least one code section comprises code for wrapping around to a first of said allocated first plurality of receive buffer descriptors, when a last one of said allocated first plurality of receive buffer descriptors is utilized.

20. The non-transitory machine-readable storage according to claim 11, wherein said at least one code section comprises code for wrapping around to a first of said allocated plurality of playback buffer descriptors, when a last one of said allocated plurality of playback buffer descriptors is utilized.

21. A system for processing a packet, the system comprising:
one or more circuits that enable allocating a first plurality of receive buffer descriptors for recording at least one received packet in at least a portion of a shared memory;
said one or more circuits enable recording said at least one received packet in said at least a portion of said shared memory utilizing at least one of said allocated first plurality of receive buffer descriptors;
said one or more circuits enable allocating, responsive to said recording, a plurality of playback buffer descriptors for playback of said recorded said at least one received packet from said at least a portion of said shared memory; and
said one or more circuits enable decoding a first portion of said at least one received packet from said shared memory, while recording a second portion of said at least one received packet in said shared memory.

22. The system according to claim 21, wherein said one or more circuits enable simultaneously playing back of said first portion of said at least one received packet from said shared memory, while recording said second portion of said at least one received packet in said shared memory.

23. The system according to claim 21, wherein said one or more circuits enable de-allocation of said plurality of playback buffer descriptors corresponding to a number of said consumed recorded at least one received packet, when at least one of said recorded at least one received packet is consumed.

24. The system according to claim 23, wherein said one or more circuits enable allocation of a second plurality of receive buffer descriptors corresponding to said number of said consumed recorded at least one received packet.

25. The system according to claim 21, wherein said at least one received packet comprises a Transport Passage packet.

26. The system according to claim 21, wherein said one or more circuits enable allocation of approximately one half of said shared memory for said recording of said at least one received packet.

27. The system according to claim 21, wherein said one or more circuits enable decoding of said at least one received packet prior to said recording.

28. The system according to claim 21, wherein said one or more circuits enable decoding of said recorded at least one received packet prior to playback.

29. The system according to claim 21, wherein said one or more circuits enable wrapping around to a first of said allocated first plurality of receive buffer descriptors, when a last one of said allocated first plurality of receive buffer descriptors is utilized.

30. The system according to claim 21, wherein said one or more circuits enable wrapping around to a first of said allocated plurality of playback buffer descriptors, when a last one of said allocated plurality of playback buffer descriptors is utilized.

* * * * *